United States Patent [19]

Chu et al.

[11] Patent Number: 5,890,055
[45] Date of Patent: Mar. 30, 1999

[54] METHOD AND SYSTEM FOR CONNECTING CELLS AND MICROCELLS IN A WIRELESS COMMUNICATIONS NETWORK

[75] Inventors: Ta-Shing Chu, Lincroft; Martin V. Clark, Matawan; Peter Frank Driessen, Aberdeen; Vinko Erceg, Roselle Park; Lawrence Joel Greenstein, Edison; Robert Stephen Roman, Red Bank; Anthony Joseph Rustako, Jr., Colts Neck; Giovanni Vannucci, Township of Middletown, all of N.J.

[73] Assignee: Lucent Technologies Inc., Murray Hill, N.J.

[21] Appl. No.: 508,858

[22] Filed: Jul. 28, 1995

[51] Int. Cl.⁶ .................................................. H04Q 07/36
[52] U.S. Cl. .............................. 455/16; 455/17; 455/21; 455/23; 455/562; 455/446
[58] Field of Search .................................. 455/7, 14, 15, 455/16, 17, 20, 23, 25, 33.1, 56.1, 422, 446, 447, 448, 524, 562, 561, 60; 333/137, 126

[56] References Cited

U.S. PATENT DOCUMENTS

| | | | |
|---|---|---|---|
| 4,333,076 | 6/1982 | Cachier | 333/137 X |
| 4,606,054 | 8/1986 | Amitay et al. | 455/60 |
| 4,941,200 | 7/1990 | Leslie et al. | 455/20 X |
| 5,247,269 | 9/1993 | Boulouard et al. | 333/126 |
| 5,509,028 | 4/1996 | Marque-Pucheu | 455/7 X |
| 5,526,348 | 6/1996 | Ichiyoshi | 455/56.1 X |
| 5,564,072 | 10/1996 | Garcia Aguilera et al. | 455/7 X |

OTHER PUBLICATIONS

Peninsula Wireless Communications, "MC–800 Microwave microCell," Marketing Brochure, Nov. 1994. Technological background of the invention.

M. A. Gauldin et al., "The 5ESS Wireless Switching Center," *AT&T Technical Journal*, Vol. 72, No. 4, Jul./Aug. 1993, pp. 38–47. Cited in application; technological background of the invention.

Decibel MultiMedia Microcell Systems, "MicroSpan Microwave Transmission Microcells," Marketing Brochure, 1992. Technological background of the invention.

*Primary Examiner*—Wellington Chin
*Assistant Examiner*—Philip J. Sobutka

[57] ABSTRACT

A wireless communications system includes a number of clusters of repeaters wherein all repeaters within a cluster are connected to a common hub via respective millimeter-wave radio links. Wireless signals received by the repeaters from end-user devices are transparently carried by the millimeter-wave radio links to respective hubs that act as concentrators for the repeaters. The hubs may be linked to a wireless network base station (in an outdoor setting) or alternatively to a server or a PBX (in an indoor environment) via a high-speed transmission facility, such as a fiber optic cable that is thus shared by all the repeaters.

33 Claims, 5 Drawing Sheets

METHOD AND SYSTEM FOR CONNECTING CELLS AND MICROCELLS IN A WIRELESS COMMUNICATIONS NETWORK

TECHNICAL FIELD

This invention relates to a transmission system for wireless communications, and more particularly to a method and a system for connecting cells and microcells in a wireless communications network.

BACKGROUND OF THE INVENTION

Personal Communications Services (PCS) technology is expected to revolutionize the communications industry because of its potential to deliver high bandwidth information services to low-power, portable lightweight devices carried by mobile users. There are some obstacles however, that may retard the realization of this potential. For example, PCS technology has evolved to include a multidimensional communications framework that integrates a variety of mobile communications systems and services ranging from Wireless Private Branch Exchanges (WPBX) and Wireless local Area Networks (WLAN) to cellular-type PCS and cordless-type PCS. To wit, systems and services offered or scheduled to be offered under the PCS umbrella are operative at different frequencies of the spectrum, such as the 902–908 MHz frequency band at which some WPBXs operate in direct contrast to other WPBXs designed around the European cordless standards. Similarly some WLAN vendors, such as AT&T GIS, offer wireless hubs (such as WaveLAN) that operate in the 902–928 MHz frequency band in contrast to other vendors, such as Motorola, who use for their WLAN product line (such as Altair) the so-called Wireless In-Building (WIN) evolving standard that is operative at the 18 GHz frequency. The lack of a uniform well-defined standard for PCS products and services may result in a mosaic of incompatible PCS products or services unable to provide seamless communications from one product or service to another. This issue is further complicated by the fact that some PCS network designs that are based on a particular standard, are inoperative with other PCS network designs implementing a different standard. Clearly, it is desirable for PCS systems to have a transmission system that allows transparent spectrum transport such that the same hardware can be used for different air interfaces without modification.

In addition to the flexibility requirement outlined above, backhaul transmission systems for PCS networks must also be economical to allow PCS products and services to be cost-effective in order to fulfill their market potential. Hence, the prior art implementation of connecting every single PCS microcell (picocell) antenna to a base station via a fiber optic cable that is terminated on a lightwave transceiver operative at different air interfaces, is not cost-effective because of the substantial capital outlay (or expenses) required for laying down (or leasing) fiber optic cables especially in urban environments. Thus, a problem of the prior art is lack of a cost-effective backhaul transmission system that provides the flexibility benefits afforded by the transparent transport of a block of spectrum without wired connections from each microcell to a base station.

SUMMARY OF THE INVENTION

The present invention is directed to a transmission system that is comprised of a number of clusters of repeaters wherein each repeater within a cluster is connected via a respective radio link to a common hub. Wireless signals received by the repeaters from end-user devices are transparently (i.e., regardless of air interfaces) carried by radio links to respective hubs that act as signal concentrators for the repeaters. The hubs may be linked to a wireless base station (in an outdoor setting) or to a server or to a PBX (in an indoor environment) via a high-speed transmission facility, such as a fiber optic cable, that is thus shared by all the PCS repeaters within a cluster.

In accordance with the principles of the invention, each PCS repeater serves a respective microcell or picocell, and includes a PCS-band antenna and a high-gain, directional, millimeter-wave antenna for communications with the PCS hub. The PCS-band antenna is used to provide PCS-type service to low-power portable lightweight devices while the high-gain, directional millimeter-wave antenna is used for communications to the PCS hub via a line-of-sight propagation path on a millimeter-wave radio link. The PCS hub, which may itself include a PCS antenna for a microcell (or picocell), acts as a concentrator for the cluster of PCS repeaters whose signals are transparently carried by the millimeter-wave radio link.

In an embodiment of the principles of the invention, communications from a PCS repeater to a PCS hub is achieved by using analog block Frequency Modulation (block FM) techniques to modulate a block of spectrum (that may be, for example, a five MHz band of frequencies) onto a millimeter-wave carrier for transmission over the millimeter-wave link. Specifically, signals that are received by a PCS repeater from PCS end-user devices, are amplified and then converted to low intermediate frequency (IF) signals (1–6 MHz near baseband, for example). The IF signals are subsequently applied as a modulating signal to a voltage-controlled oscillator operating at a much higher frequency ( near 38 GHz, for example) to linearly frequency modulate a carrier for transmission over the millimeter-wave radio link. Alternatively, the voltage-controlled oscillator may operate at a lower frequency that is multiplied up to the output frequency. Similarly, the PCS hub is arranged to convert a signal received from a networking device, such as a wireless base station, to a low IF signal that is applied as a modulating signal to a voltage-controlled oscillator operating at a different frequency range (such as the 39 GHz frequency range). The output of the voltage-controlled oscillator is then transmitted to the appropriate repeaters via millimeter-wave radio links.

Communications from a repeater to a wireless end-user device is achieved by converting a millimeter-wave signal derived from the wireless base station to an intermediate frequency signal that is subsequently amplified and frequency demodulated to yield a near baseband version (1–6 MHz for example) of the PCS signal to be transmitted. The latter signal is in turn frequency-translated up to the desired PCS carrier frequency and transmitted after power amplification.

DETAILED DESCRIPTION

Figure 1:
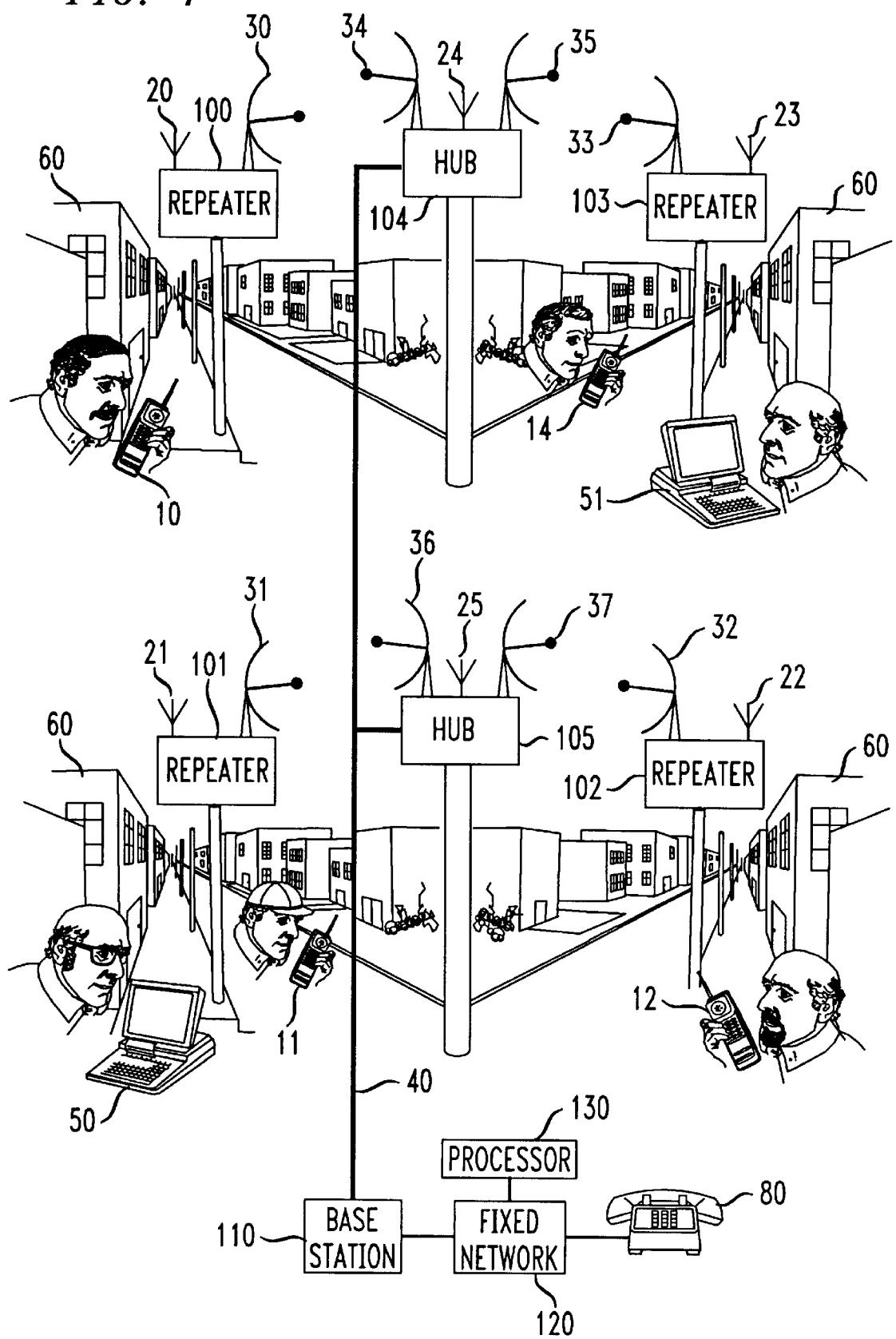
FIG. 1 is a block diagram of an illustrative PCS outdoor network implementing the principles of the invention.

FIG. 1 is a block diagram of an illustrative PCS outdoor network implementing the principles of the invention. The PCS network of FIG. 1 includes microcell repeaters 100, 101, 102 and 103, microcell hubs 104 and 105, base station 110 and a fixed network 120. Microcell repeaters 100, 101, 102 and 103 that may be mounted, for example, on 10-meter high utility poles, lamp posts or sides of buildings on different streets, are the PCS network points of access and egress for wireless end-user devices. Examples of those devices are shown in FIG. 1 as the wireless telephone sets 10, 11, 12 and 14, and the multimedia workstations 50 and 51 that are arranged to receive information from, and transmit information to the closest of the repeaters 100, 101, 102 and 103 or hubs 104 and 105 via respective PCS-band antennas 20, 21, 22, 23, 24 and 25. As described in detail below, information received over PCS-band antennas 20, 21, 22 and 23 is frequency-translated from a given PCS carrier frequency to near baseband in order to produce a desired modulating signal for the millimeter-wave frequency signal that is transmitted to respective microcell hubs 104 and 105 via respective millimeter-wave antennas 30, 31, 32 and 33. Those antennas could be parabolic, directional, high gain antennas that are placed within a Line-of-Sight (LOS) path of a similar antenna 34/35 (36/37) mounted on the microcell hub 104 (105) to form the millimeter-wave links from each one of the microcell repeaters 100, 103 (101, 102) to the microcell hub 104 (105). Because of the Line-of-Sight (LOS) requirement, microcell hub 104 (105) that may also be mounted on a utility pole or a lamp post, is best located at street intersections (although not necessarily) for communications with microcell repeaters 100 and 103 (101 and 102). In an actual implementation of the principles of the invention, millimeter-wave antennas 30, 31, 32, 33, 34, 35 36 and 37 are designed with one-foot diameter aperture such that the achievable narrow antennas beamwidths provide sufficient gain to compensate for attenuation caused by atmospheric factors, such as heavy rain or snow storms, and also provide freedom from multipath effects caused by reflection from adjacent buildings 60-A to 63-D.

Each one of the microcell repeaters 100, 101, 102 and 103 homing on microcell hub 104 or 105 requires a unique pair of channels (one channel for each direction of transmission) of millimeter-wave spectrum. While those channels are unique for a particular link connecting a repeater to a hub, the frequency associated with those channels can be reused by other links. This is because the mainlobe-to-backlobe ratio of directional millimeter-wave antennas 34, 35, 36 and 37 makes it possible for two adjacent links to use the same millimeter-wave frequency. Moreover, channel isolation is further improved by using orthogonal polarizations, as described in further detail below.

Also shown in the block diagram of FIG. 1 is base station 110 that is connected to microcell hubs 104 and 105 via a high-speed transmission facility 40. The transmission facility 40 may be implemented, for example, as a fiber optic cable that is terminated on a lightwave transceiver, such as the AT&T Lightwave Microcell Transceiver (LMT) that is arranged to transparently translate a received Radio Frequency (RF) signal to an optical signal by direct modulation of a laser with the received RF signal. Base station 110 acts as a gateway for communications between the fixed network 120 and the wireless network of FIG. 1. Base station 110 may be comprised of hardware and software components that perform call setup and switching functions for calls originated from, or destined for wireless end-user devices 10, 11, 12, 14, 50 and 51. The call setup and switching functions of base station 110 include allocation and administration of radio channels for active wireless end-user devices, tearing down a connection at the end of a call, coordination of call hand-offs from one microcell site to another. Among the components that may be co-located in base station 110 is a Mobile Switching Center (not shown) which is a processor-controlled software-driven switching system arranged to provide seamless communications paths for calls that are routed over the wireless network of FIG. 1, and that are destined for either a wireless end-user device or a wired telephone set connected to fixed network 120. The latter is a land-line network that is comprised of interconnected local and toll switches (not shown) that enable a call originated from a wireless end-user communications device to be completed to a wired end-user communications device, such as telephone set 80. A description of a Mobile Switching Center and associated connections to a wireless network can be found in an article by Gauldin et. al entitled "*The 5ESS® Wireless Mobile Switching Center*" AT&T Technical Journal, Volume 72, No. 4, July/August 1993.

Although FIG. 1 shows base station 110 connected to hubs 104 and 105 via a wired facility 40, it is to be understood that hubs 104 and 105 may also be connected to base station 110 via respective radio links. Similarly, it is also possible for base station 110 to be co-located with one of the hubs 104 and 105.

Figure 2:
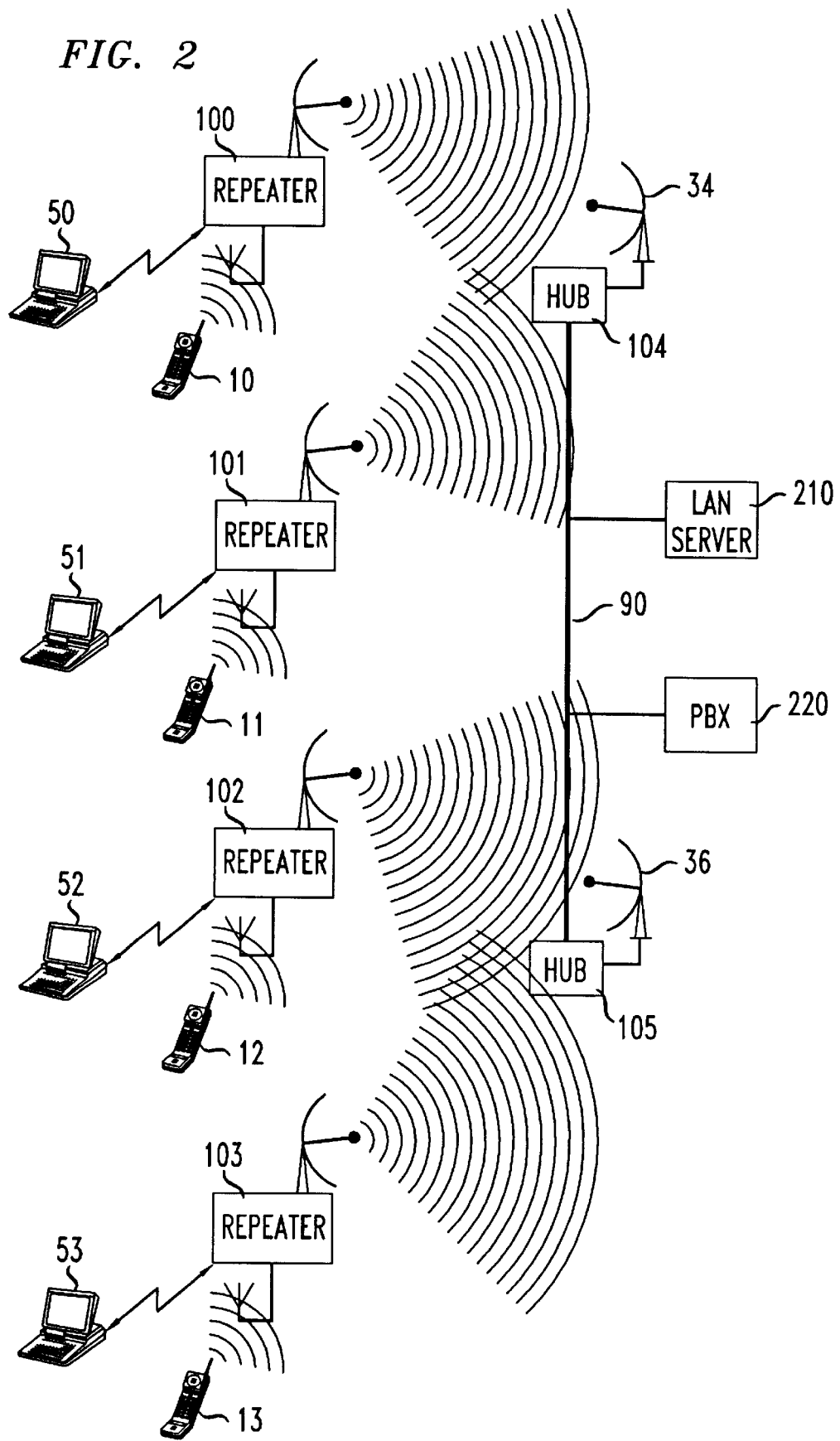
FIG. 2 is a block diagram of a PCS indoor network implementing the principles of the invention.

FIG. 2 is a block diagram of a PCS indoor network implementing the principles of the invention. The PCS network of FIG. 2 includes picocell repeaters 100–101, and 102–103 that are located within Line-of-Sight (LOS) of picocell hubs 104 and 105, respectively, that are in turn connected to LAN server 210 and PBX 220 via, for example, wired or fibered transmission facility 90. The picocell repeaters 101 to 103 may be ceiling mounted to allow an unobstructed wireless communications path between those repeaters and end-user wireless communications devices 10–13 and 50–53. End-user communications devices 50–53 may be implemented as portable processors or notebook computers equipped with a network interface adapter, an integrated RF modem, PCS radio transceiver and suitable PCS antenna. Alternatively, wireless end-user devices 50–53 may be personal multimedia terminals equipped with a wireless network interface adapter that may conform, for example, to the well-known Personal Computer Memory Card International Association (PCMCIA) standards.

Repeaters 100 to 103 have all the features described above for the outdoor networking environment of FIG. 1, except that in the indoor environment, they operate at different frequencies for different applications. For example, repeaters 100–103 may use direct sequence (or frequency hopping) spread spectrum techniques in both the 900 MHz, 2.45 GHz or higher frequency ISM bands for communications with wireless end-user devices 50–53. Alternatively, repeaters 100–103 may radiate RF signals (destined for wireless end-user devices 50–53) at the 18 GHz frequency that is used by some WLAN products, such as the Altair WLAN from Motorola. Likewise, communications between repeaters 100–103 and wireless telephone sets 10–13 may take place at yet another frequency that is applicationdependent. For example, if PBX 220 or LAN server 210 are multimedia communications devices serving multimedia end-user devices, repeaters 100–103 may operate at a higher frequency than if LAN server 210 and PBX 220 are single medium communications devices.

Regardless of the operating frequency of repeaters 100–103, they communicate with respective hubs 104–105 via a Line-of-Sight millimeter-wave link that may operate, for example, at a frequency near 38 GHz or higher with reasonable transmit powers (less than 100 mW). Advantageously, the repeater of FIG. 2 does not need to be reconfigured as traffic demand increases.

Figure 3:
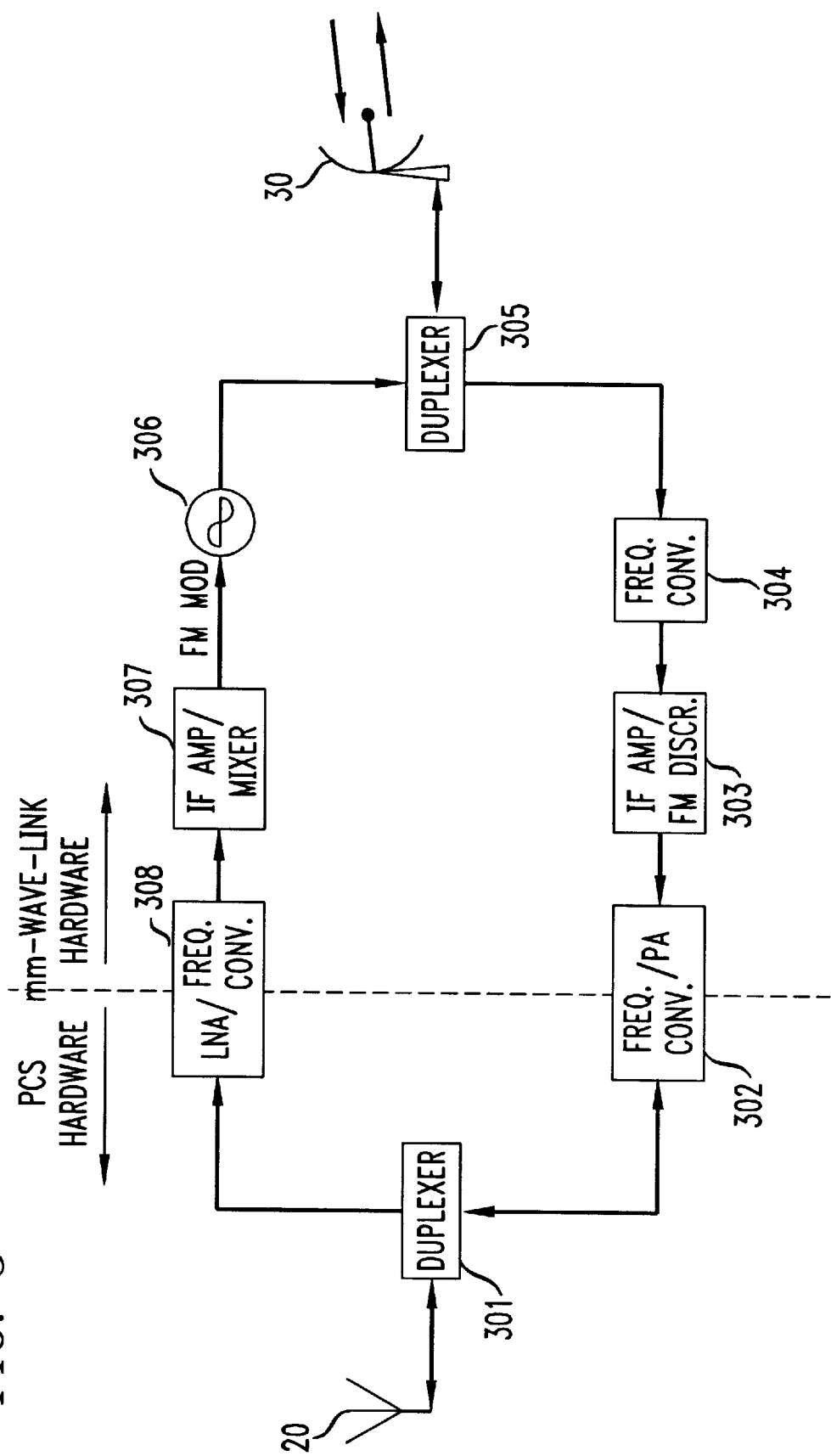
FIG. 3 shows a block diagram of an illustrative PCS repeater arranged in accordance with the invention to communicate with a PCS hub.

FIG. 3 shows a block diagram of an illustrative repeater arranged in accordance with the invention to transmit and receive signals to a hub as well as to a wireless end-user device. The repeater of FIG. 3 includes a PCS-band antenna 20 that is connected to a duplexer 301 and a millimeter-wave antenna 30 that is linked to a duplexer 305. Also shown in the repeater of FIG. 3 are frequency converters 302 and 308, Intermediate Frequency Amplifier/Mixer 303 and 307 and frequency-modulated mm-wave source 306. Antenna 30 is a high-gain millimeter-wave, directional, antenna that is placed within line-of-sight of hub 104. Antenna 30 may be, for example, a one-foot-diameter parabolic reflector that is used for both signal transmission and reception. Accordingly, duplexer 305 is used to separate signals received and transmitted by the repeater of FIG. 3. The selected frequency difference between the received and transmitted signals (700 MHz, for example) should be adequate for good duplexer performance at a reasonable cost. Similarly, duplexer 301 is used to differentiate PCS signals transmitted by the repeater of FIG. 3 to the wireless end-user devices from PCS signals received by the repeater of FIG. 3 from those end-user devices.

When the repeater of FIG. 3 receives a frequency-modulated millimeter-wave signal from one of the hubs 104–105, that signal is transmitted by duplexer 305 to frequency converter 304 which down-converts the millimeter-wave signal to an intermediate frequency (IF) in the UHF or microwave range. Alternatively, a low-noise amplifier could precede the frequency converter to improve noise figure. The IF signal is then forwarded to the IF amplifier and FM discriminator 303. The latter includes a) an amplifier which is arranged to boost the gain element of the received IF signal that is generally relatively weak after the frequency conversion and b). a FM signal discriminator or detector which is arranged to demodulate the IF FM-based signal carrier and recovers therefrom the near-baseband version of a PCS signal that may be, for example, in the 1–6 MHz range. A FM signal discriminator or detector may be implemented, in the UHF frequency range, for example, with a Plessey chip SL-1455. The resulting PCS near-baseband signal is, in turn, amplified and frequency-translated up to the desired PCS carrier frequency by the frequency converter 302 before its transmission to duplexer 301 which separates received and transmitted PCS signals. It is worth noting that each one of the frequency conversions mentioned above may be accomplished in more than one step to reach a desired frequency. For example, the near-baseband signal outputted by IF amplifier/FM discriminator 303 may be initially mixed up to generate an intermediate frequency signal that is, in turn, mixed up to produce, for example, a 900 MHz signal.

When the repeater of FIG. 3 receives a PCS signal from an end-user wireless device via antenna 20, that PCS signal is transmitted by duplexer 301 to a Low-Noise Amplifier (LNA) 308 to achieve a good noise figure for the repeater of FIG. 3. The received PCS signal may be for example, a 5-MHz-wide block of PCS spectrum that is frequency-translated by the chain of LNA/frequency converter 308 and IF/Amp/Mixer 307 to a near-baseband version in the 1–6 MHz range, for example. The resulting signal is then applied to a voltage-controlled oscillator (VCO) 306 to frequency-modulate that signal onto a carrier to produce the desired millimeter-wave frequency signal that is then directly transmitted to the duplexer 305 and the millimeter-wave antenna 30.

In an illustrative embodiment of the principles of the invention, the signal outputted by VCO 306 may operate in the 38 GHz region. This choice of millimeter-wave frequency will be determined by the path parameters of the link. For outdoor applications, frequencies near 38 GHz might be preferable due to path attenuation from rain. For indoor applications, higher millimeter-wave frequencies might be better suited. In an actual implementation of the principles of the invention, the modulating signal at the port of VCO 306 is subjected to pre-emphasis. Specifically, when the repeater of FIG. 3 is transmitting to hub 104, $f^2$ weighting is applied over the 1 to 6 MHz region before frequency-modulating the signal entering VCO 306. Likewise when the repeater of FIG. 3 is receiving signals from hub 104, $f^2$ weighting is applied to IF Amp/FM discriminator 303.

Figure 4:
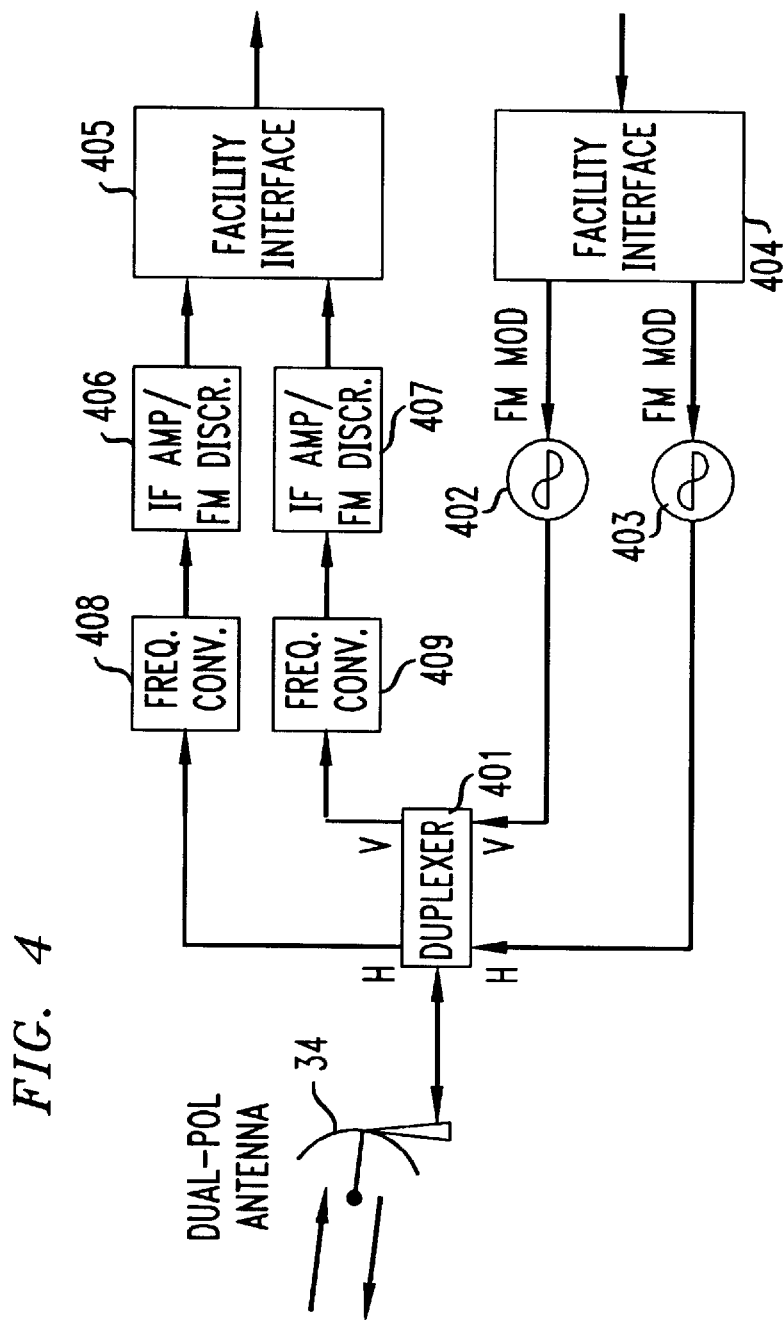
FIG. 4 is a block diagram of an illustrative PCS hub designed in accordance with the invention to communicate with the PCS repeater of FIG. 4 over a millimeter-wave link, and with a PCS base station over a fiber optic link or other high-bandwidth medium.

FIG. 4 is a block diagram of an illustrative hub designed in accordance with the invention to communicate with the repeater of FIG. 3 over a millimeter-wave link. The hub 104 of FIG. 4 has some hardware components that are the same as those used for the repeater of FIG. 3, such as the millimeter-wave antenna (in this case antenna 34) that is for both signal reception and transmission. In the case of hub 104 ; however, the design of duplexer 401 is more complex because there may be multiple repeaters served by the same millimeter-wave antenna. In this example, the hub 104 communicates with two repeaters that use orthogonal polarizations (Vertical and horizontal, for example). This allows the two signals to be combined or separated with virtually no loss penalty. Thus, duplexer 401 is both a frequency duplexer, to separate transmitted and received signals, and a polarization duplexer, to separate the signals from/to the two different microcell repeaters. Additionally, signals from two different repeaters may be transmitted at two different respective frequencies thereby allowing implementation of a single polarization scheme, as opposed to a dual polarization scheme.

For signals that are received at the hub 104 from one of the repeaters 100 and 103, and that are transmitted to the common network backbone facility (shown as facility 40 in FIG. 1 and facility 90 in FIG. 2), there is only minimal processing required: Those signals, which may be, for example, 38 GHz FM-based signals, are down-converted by the frequency converter 408 (409) to different intermediate frequencies in the 500 MHz region, for example. Because the gain elements of the frequency converters 408 (409) are relatively weak, the IF signals are amplified in IF amplifier 406 (407) before being demodulated by a frequency discriminator therein to recover a near-baseband signal in the 1–6 MHz region. The near-baseband signal can then be used to linearly modulate, for example, a solid-state laser included in facility interface 405 when the latter is a fiber interface. The center frequencies of the individual signals can be chosen such that the frequencies of all the third-order intermodulation products fall in parts of the spectrum where no signals are present. The application of this technique in a multi-channel analog fiber transmission system reduces the linearity requirements for the fiber facility.

One of the benefits of this arrangement when fiber optic transmission facilities are used, is that intermodulation products of the signals carried on the facilities are avoided because control of the frequency placement of the individual signals allows selection of signal frequencies that can take advantage of the typically large bandwidth of fiber-optic facilities. This involves the penalty of requiring a larger total bandwidth than if the channels were packed as close as possible. Thus, bandwidth can be traded off for linearity. A fiber interface may be implemented using, for example the AT&T Lightwave Microcell Transceiver or a variant thereof.

Also shown in FIG. 4 is facility interface 404 that is arranged to receive a near-baseband 1–6 MHz signal from base station 110 of FIG. 1 (or PBX 220 or LAN 210 of FIG. 2) via the facility 40 (or 90). When implemented as a fiber interface, facility interface 404 is different from facility interface 405 in the sense that it does not have to satisfy as strict a linearity requirement because, typically, the dynamic range of the signal to be transmitted is considerably less. Signals received in facility interface 404 are demodulated to recover a 1–6 MHz range signal that is then applied to one of the voltage-controlled oscillators (VCO) 402 or 403 that frequency modulates that signal on a carrier to produce the desired millimeter-wave frequency signal that is then directly transmitted to the duplexer 401 and the millimeter antenna 34. In certain implementations, it might be desirable to amplify and up-convert the frequency of the near-baseband signal recovered from the facility interface 404 prior to its modulation by VCO 402 or 403.

An important alternative implementation of the facility interfaces 404 and 405 is the "digital solution". This consists of digitizing the analog signals using fast Analog-to-Digital (A/D) converters and then multiplexing the digital streams onto the fiber using a standard digital interface. Conceptually, this may seem much more complex than the analog solution because the aggregate bit rate which is implementation-dependent, is likely to exceed 1 Gbit/s. However it benefits from being a "standard" way of sending analog signals over fiber.

Figure 5:
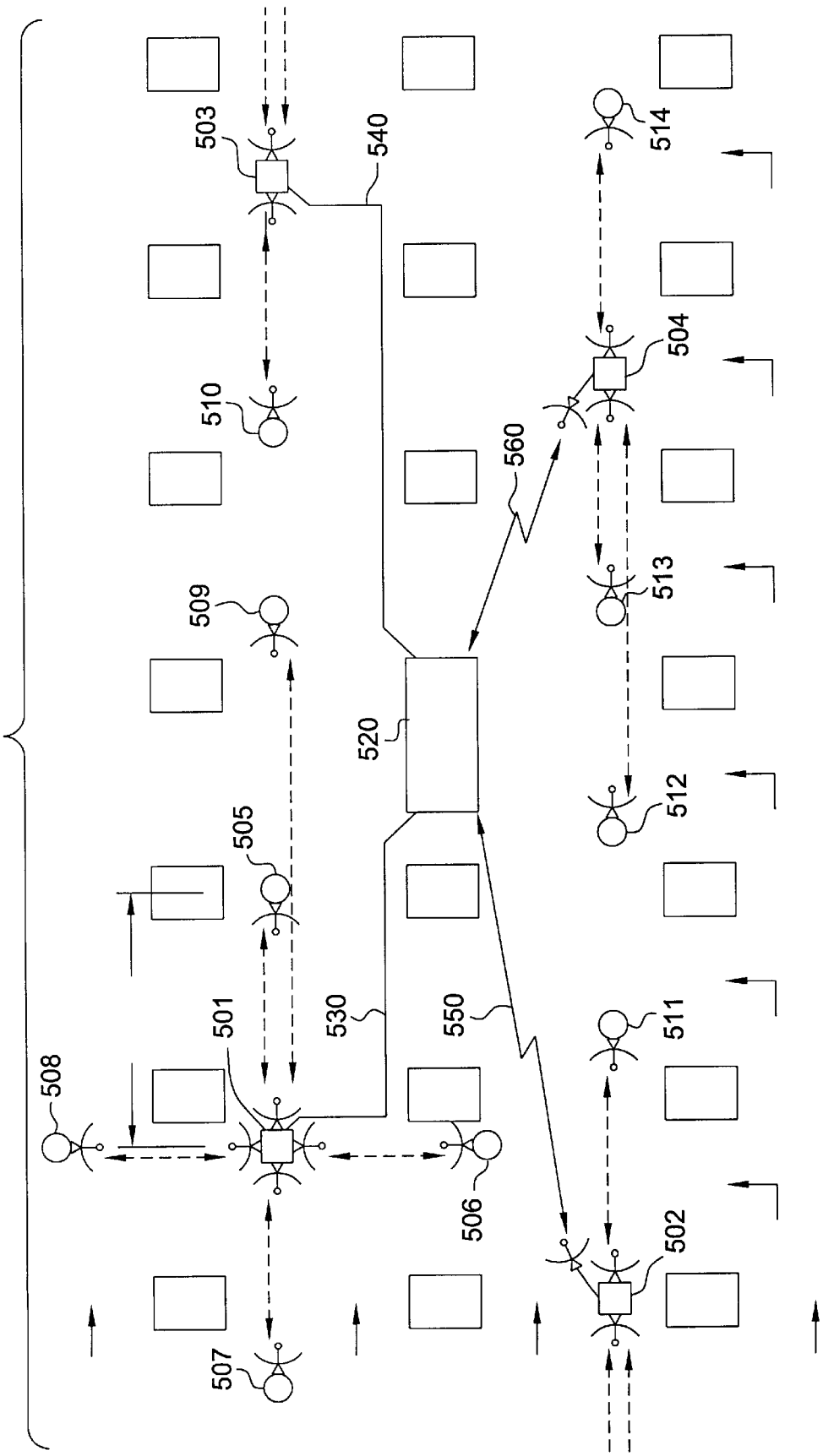
FIG. 5 shows a configuration of an illustrative metropolitan PCS network implementing the principles of the invention.

FIG. 5 depicts a top view of an illustrative metropolitan PCS network implementing the principles of the invention. The PCS network of FIG. 5 shows hubs 501, 502, 503 and 504 that are located at the intersection of thoroughfares called "avenues" and "streets". Within a radius of approximately one kilometer from each hub are placed a number of associated repeaters that are within line-of-sight of each hub. For example, hub 501 is associated with repeaters 505, 506, 507, 508 and 509. Similarly, hub 503 is wirelessly connected to repeater 510 while hubs 504 and 502 serve repeaters 512514 and 511, respectively. Hubs 501, 502, 503 and 504 play the dual role of a) repeaters for mobile end-user devices which transmit PCS signals thereto, and b) concentrators for associated repeaters which forward traffic thereto for transmission to base station 520. It is worth noting that while the repeaters in FIG. 5 are within line-of-sight of an associated hub, they are not necessarily within line-of-sight of each other or the base station 520 serving those repeaters. Base station 520 is connected to hubs 501 and 503 via broadband wired facilities 530 and 540 which may be fiber optic or co-ax cables. By contrast, hubs 502 and 504 are connected to base station 520 via radio links 550 and 560, respectively. When radio links 550 and 560 operate at millimeter-wave frequencies, hubs 502 and 504 must be within line-of-sight of base station 520.

Each repeater in the illustrative PCS communications network of FIG. 5 provides wireless communications to low-power mobile end-user devices within the coverage area of an associated cell site. Because of propagation loss and the low-power nature of the mobile end-user devices, each repeater is equipped with an antenna that is mounted at heights of around 10 meters, which is well below the rooftops of surrounding buildings represented by the rectangles in FIG. 5. This limits the coverage area of each cell site. Because of the limited coverage area provided by each cell site, a great number of repeaters and associated connections to the base station are required to provide ubiquitous coverage. The capital outlay that is needed for such an infrastructure may be cost-prohibitive at PCS service introduction time. Because the number of PCS subscribers is expected to be moderate at service introduction time, it may be unnecessary to dedicate networking capacity to each cell site/repeater.

According to another aspect of the invention, repeaters associated with a hub (hereinafter called "repeaters within a cluster") may be arranged to operate together in a "simulcast" fashion. Specifically, when a mobile end-user device transmits a PCS signal, all repeaters within the cluster which receive the PCS signal, transmit the same PCS signal (or a version thereof) to the associated hub (in the cluster) via their respective radio links. In addition to receiving the individual versions of the PCS signal from the repeaters in the cluster, the hub (in its role as a repeater) also receives the PCS signal from the mobile end-user device. Thereafter, the hub simply adds (in a linear combiner, for example) the individual versions of the common PCS signal to the PCS signal received therein to produce a single composite signal that is transmitted to the base station 520. Alternatively, the hub may transmit the individual versions including its own version of the PCS signal to base station 520 which performs the signal addition operation mentioned earlier. In both arrangements, the different repeaters within a cluster act as different parts of a distributed antenna. In the downstream direction, the hub broadcasts each communications signal received from the base station 520 to all the repeaters within the cluster. Advantageously, the use of simulcast simplifies the fiber interface in the hub because only one signal needs to arrive to the hub via the fiber. Similarly, the signals received by repeaters in the same cluster can be frequency-translated to the same frequency in the hub and added together prior to transmission over the fiber, as mentioned above, thus reducing the bandwidth requirement on the fiber. A further advantage of the use of simulcasting is that no hand-off is required when a mobile end-user device moves between two cell sites in the same cluster. Yet another advantage of the use of simulcasting is that it provides an evolutionary solution for low-traffic areas that allows the range of PCS coverage to be extended at minimal cost through the utilization of a transport infrastructure that can be re-used as traffic demand increases and network capacity has to be dedicated to individual cell sites.

The foregoing is to be construed as only being an illustrative embodiment of the principles of this invention. Persons skilled in the art can easily conceive of alternative arrangements providing functionality similar to this embodiment without any deviation from the fundamental principles or the scope of this invention.

We claim:

1. A transmission system for use in a wireless communications network, said system comprising
   at least one cluster of repeaters wherein each one of said repeaters receives a) wireless signals from wireless end-user devices via respective wireless links to produce communications signals destined for a networking device of said communications network; and b) information signals from said networking device to deliver wireless signals to at least one of said wireless end-user devices; and at least one hub wherein each hub communicates with a) said networking device via a transmission link, and b) repeaters that are associated with a single cluster, and that are within line-of-sight of each hub, said communication with said associated repeaters being carried out via respective radio links which provide respective communications paths for said communications signals and said information signals to be exchanged between said associated repeaters, said each hub and said networking device, said hub further including a polarization duplexer which uses orthogonal polarization to associate each received communications signal to a particular repeater which transmitted thereto said communication signal.

2. The invention of claim 1 wherein said at least one hub is also a repeater which communicates with wireless end-user devices within said hub's vicinity.

3. The invention of claim 1 wherein one of said repeaters within the cluster is not within line-of-sight of other repeaters within the cluster.

4. The invention of claim 1 wherein said radio link is a millimeter-wave link.

5. The invention of claim 1 wherein said repeater further includes a first antenna for communications with said at least one wireless end-user device; and a second antenna for communications with said hub, said second antenna being placed within line of sight of a corresponding antenna connected to said hub.

6. The invention of claim 1 wherein said hub further includes at least one duplexer a) which separates information signals transmitted to a particular one of said associated repeaters from communications signals received from said particular one of said associated repeaters, and b) separates information signals transmitted to different ones of said associated repeaters.

7. The invention of claim 1 wherein at least one of said repeaters receives a plurality of said wireless signals from a plurality of wireless end-user devices operative at different air interfaces and wherein said at least one repeater receives said plurality of wireless signals as a block of spectrum in aggregate form.

8. The invention of claim 1 wherein said networking device is selected from a group of devices which include a) a base station b) a processor and c) a wireless private branch exchange.

9. The invention of claim 1 wherein said at least one hub further includes a first processor which receives said information signals from said networking device and converts said information signals into a format suitable for transmission over said respective radio link; and a second processor which a) receives said communications signals via said respective radio link and b) modulates said communications signals for transmission to a transceiver which terminates a facility connected to said networking device.

10. The invention of claim 1 wherein said at least one hub is co-located with said networking device.

11. The invention of claim 1 wherein at least one of said repeaters includes a first signal processor which processes said wireless signals received from said wireless end-user devices to produce said communications signals destined for said networking device; and a second signal processor which processes information signals received from i) said networking device via a hub associated with said repeater, and ii) said respective radio link in order to output said wireless signals to said at least one wireless end-user device.

12. The invention of claim 11 wherein said first signal processor further includes a frequency converter which converts said received wireless signals into intermediate frequency signals; and a modulator which frequency-modulates said intermediate frequency signals onto a carrier to generate said communications signals transmitted to said hub via said respective radio link.

13. The invention of claim 11 wherein said second signal processor further includes a frequency converter which converts said information signals received from said hub into respective intermediate frequency signals of lower frequency; and a frequency-modulated signal detector which recovers from said respective intermediate frequency signals a baseband signal that is further processed to generate said wireless signals transmitted to said at least one wireless end-user device.

14. A wireless communications network comprising at least one repeater which a) receives at least one wireless signal from at least one nearby wireless end-user device, b) converts said at least one received wireless signal to an intermediate frequency signal, and c) frequency-modulates said intermediate frequency signal onto a carrier for transmission over a radio link operative at a selected frequency range; and at least one hub which a) receives via said radio link said frequency-modulated signal from said at least one repeater that is placed within line-of-sight of said at least one hub, and b) demodulates said frequency-modulated signal to produce a demodulated near baseband signal that is subsequently up converted to a selected carrier frequency for communication to a transceiver which terminates a transmission link connected to a communications device of said wireless communications network, said hub including a polarization duplexer that uses orthogonal polarizations to associate each received communications signal to a particular repeater which transmitted thereto said communications signal.

15. The invention of claim 14 wherein said wireless communications network includes more than one of said hubs wherein each one of said hubs communicates via respective radio links to more than one repeater.

16. The invention of claim 15 wherein said at least one repeater receives more than one wireless signal from more than one wireless end-user device, in aggregate form as a block of spectrum.

17. A transmission system for wireless communications network comprising a plurality of hubs wherein each one of said hubs a) receives communications signal from an associated networking device and b) converts said communications signal to a near baseband signal that is subsequently frequency-modulated for transmission over a radio link operative at a selected frequency range, each of said hubs including a polarization duplexer that uses orthogonal polarizations to associate each received communications signal to a particular repeater which transmitted thereto said communications signal; and a plurality of repeaters grouped into clusters wherein repeaters within a cluster are located with line-of-sight of an associated one of said hubs and wherein said repeaters within a cluster a) receive said frequency-modulated signal from said associated hub via said radio link and b) demodulate said respective frequency-modulated signal to produce a demodulated signal that is subsequently frequency-translated to at least one wireless carrier frequency for transmission to at least one nearby wireless end-user device operative at one or more air interfaces.

18. The invention of claim 17 wherein said radio link is a millimeter-wave link.

19. A method of communicating wireless information in a wireless communications network, said method comprising the steps of:
receiving in at least one repeater a wireless signal from a wireless end-user device at a first frequency range, and a communications signal at a second frequency range;
processing in said at least one repeater a) said wireless signals to produce frequency-modulated signals that are transmitted over a radio link operative at said second frequency range, and b) said communications signals to produce said wireless signal that is transmitted to said wireless end-user devices at said first frequency range;
receiving in a hub located within line-of-sight of said at least one repeater a) a data signal from a networking device of said wireless communications network, and b) said frequency-modulated signal from said at least one repeater, said hub including a polarization duplexer that uses orthogonal polarizations to associate such received communications signal to a particular repeater that transmitted thereto said communications signal;
processing at said hub a) said data signal to generate said commnications signal that is transmitted to said at least one repeater via said radio link, and b) said frequency-modulated signal that is demodulated to be subsequently modulated at a selected carrier frequency for communication to a transceiver which terminates a wired transmission link connected to said communications device.

20. The method of claim 19 wherein said radio link is a millimeter wave link.

21. The method of claim 19 wherein said networking device is selected from a group of devices which include a) a base station b) a processor, and c) a wireless private branch exchange.

22. The method of claim 19 wherein said hub is also a repeater which receives wireless signals from nearby wireless end-user devices.

23. A system for communicating wireless information in a wireless communications network, said method comprising the steps of:
at least one repeater which a) receives a wireless signal from a wireless end-user device at a first frequency range, and a communications signal at a second frequency range, and b) processes i) said wireless signal to produce a frequency-modulated signal that is transmitted over a radio link operative at said second frequency range, and ii) said communications signal to produce said wireless signal that is transmitted to said wireless end-user device at said first frequency range;
a hub that is located within line-of-sight of said at least one repeater and a) receives a data signal from a networking device of said wireless communications network, and said frequency-modulated signal from said at least one repeater b) processes i) said data signal to generate said communications signals that are transmitted to said at least one repeater via said radio link, and ii) said frequency-modulated signal that is demodulated to be subsequently modulated at a selected carrier frequency for communication to a transceiver which terminates a wired transmission link connected to said communications device, said hub including a polarization duplexer that uses orthogonal polarizations to associate each received communications signal to a particular repeater that transmitted hereto said communications signal.

24. The invention of claim 23 wherein said radio link is a millimeter wave link.

25. The invention of claim 23 wherein said networking device is selected from a group of devices which include a) a base station b) a processor, and c) a wireless private branch exchange.

26. The invention of claim 23 wherein said hub is also a repeater which receives a wireless signal from a nearby wireless end-user device.

27. A wireless communications network comprising
at least one cluster of repeaters wherein each one of said repeaters within said cluster simulcasts a respective individual version of a common wireless information signal received from a wireless end-user device, and destined for a networking device;
a hub which a) receives at first frequency range said common wireless signal from said wireless end-user device, and at a second frequency range each said individual version of said common wireless signal from each one of said repeaters via respective radio links b) adds said common wireless signal received therein to a total of each said received individual version received from each one of said repeaters to generate a composite signal which is transmitted to said networking device, and c) transmits to each one of said repeaters a common wireless communications signal that is received from said networking device in order to allow each repeater to act as a different port of a distributed antenna.

28. The invention of claim 27 wherein each one of said repeaters is placed at a given distance of said hub in order to increase the range of coverage of said wireless communications network.

29. The invention of claim 27 wherein said networking device is selected from a group of devices which include a) a base station b) a processor and c) a wireless private branch exchange.

30. The invention of claim 27 wherein said addition of said common wireless signal to said total of each individual version of said common wireless signal is performed at said networking device.

31. A hub for use in a wireless communications network, said hub comprising
an antenna which a) receives modulated communications signals as a block of spectrum from a plurality of repeaters via respective radio links, said repeaters being placed within line-of-sight of said hub, and arranged to receive from nearby mobile end-users devices wireless end-user signals that are processed in said repeaters to produce said modulated communications signals, and b) transmits to said repeaters via said radio links information signals received from a networking device of said wireless communications network;
a polarization duplexer that uses orthogonal polarizations to associate each received communications signal to a particular repeater that transmitted thereto said communications signal;

a first processor which converts said information signals into a format suitable for transmission over said respective radio links; and a second processor which demodulates said modulated communications signals to produce demodulated near baseband signals that are subsequently up converted to a selected carrier frequency for communication to a transceiver which terminates a transmission link connected to said networking device.

32. The invention of claim 31 wherein said hub further includes:

at least one duplexer a) which separates information signals transmitted to a particular one of said repeaters from communications signals received from said particular one of said repeaters, and b) separates information signals transmitted to different ones of said repeaters.

33. The invention of claim 31 wherein said carrier frequency is selected such that frequencies of third order intermodulation products for said near baseband signals fall in parts of the spectrum of said transmission link where no signals are present.

* * * * *